Feb. 20, 1951     M. E. DAYTON ET AL     2,542,907
BUMPER ATTACHMENT
Filed Feb. 3, 1949
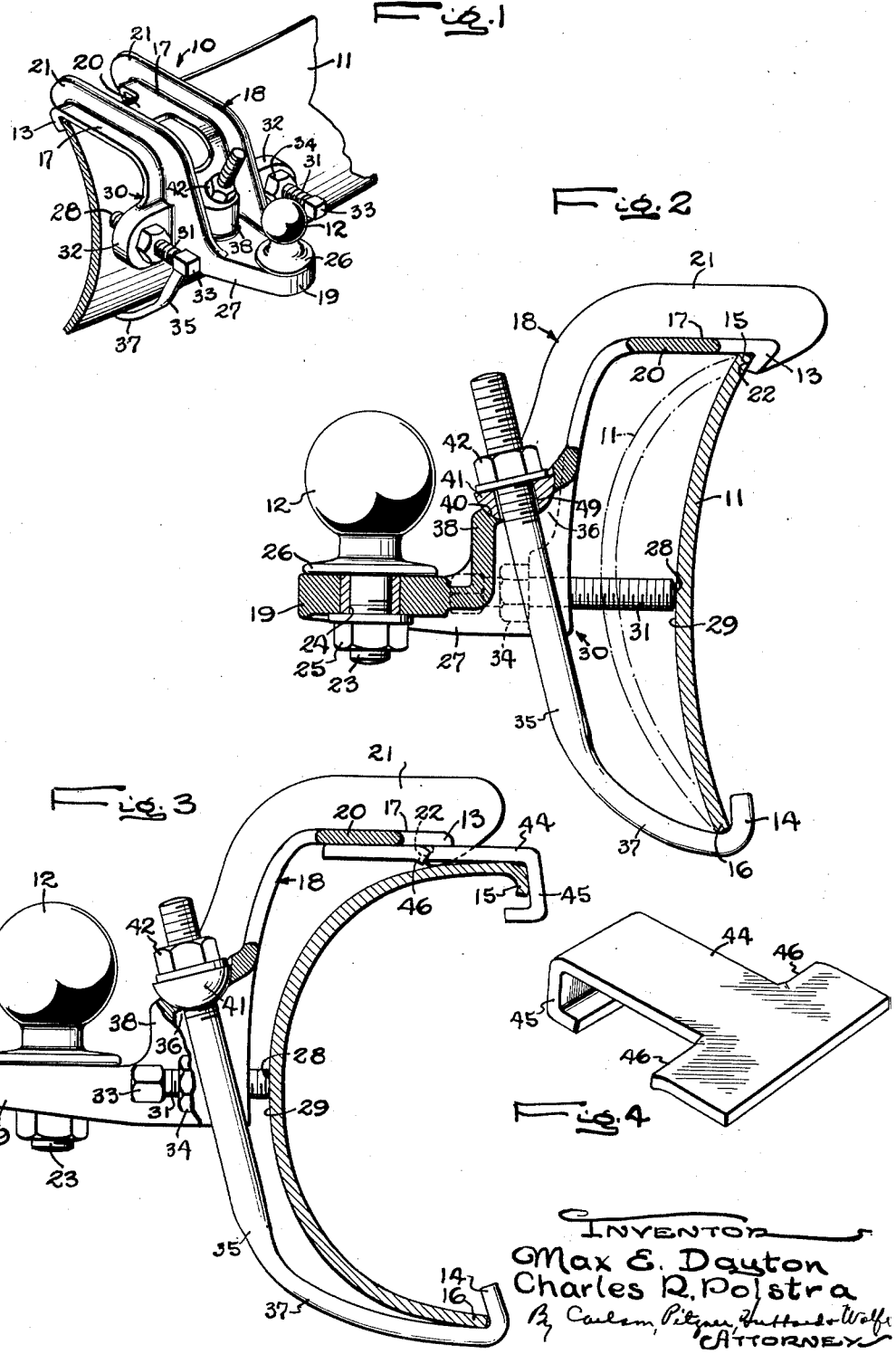

Patented Feb. 20, 1951

2,542,907

UNITED STATES PATENT OFFICE 2,542,907

BUMPER ATTACHMENT

Max E. Dayton and Charles R. Polstra, Rockford, Ill., assignors to Dayton Products Corp., Rockford, Ill., a corporation of Illinois Application February 3, 1949, Serial No. 74,392

7 Claims. (Cl. 280—33.44)

The present invention pertains generally to vehicle accessories and more particularly to a novel bracket attachment which can be detachably secured to the bumper of a vehicle for coupling a trailer or other towed vehicle to the same.

One object of the invention is to provide a coupling bracket of the foregoing type suitable for mounting upon vehicle bumpers of widely varying contours and dimensions.

Another object is to provide a bumper attachment having pivotally connected parts which are adapted to hook around opposite edges of a bumper, the inclination of one part and the coupling element rigidly therewith being determined by adjustment of an abutment on such part engageable with the outer face of the bumper.

A further object is to provide for extension of one of the hook parts to adapt the attachment for application to different bumper contours.

The invention also resides in the novel character of the connection between the hook parts to provide for coupling of the two to the bumper and also for angular adjustment of the coupling supporting part.

Other objects and advantages of the invention will become apparent from the following detailed description taken in connection with the accompanying drawings, in which Figure 1 is a perspective view of an illustrative coupling bracket embodying the invention and mounted in place upon a vehicle bumper.

Fig. 2 is an enlarged vertical sectional view taken in the longitudinal medial plane of the coupling bracket shown in Fig. 1.

Fig. 3 is a view generally similar to Fig. 2 illustrating the manner of applying the attachment to a bumper of different contour.

Fig. 4 is a perspective view of an extension jaw.

While the invention is susceptible of various modifications and alternative constructions, we have shown in the drawings and will herein describe in detail the preferred embodiment. It is to be understood, however, that we do not intend to limit the invention by such disclosure but aim to cover all modifications and alternative constructions falling within the spirit and scope of the invention as expressed in the appended claims.

Referring now to the drawings, the improved bumper attachment indicated generally at 10 is detachably mountable on a bumper 11 to support a coupling element such as a king pin 12 in upright position and spaced rearwardly from the bumper. Such bumpers are usually curved in cross section and vary considerably in width and thickness, typical shapes being shown in Figs. 2 and 3.

Generally stated, the attachment 10 comprises two jaws 13 and 14 in the form of hooks which are engageable with the upper and lower edges 15 and 16 of the bumper and have shanks which extend transversely of the bumper and cross each other at a point intermediate the bumper edges where the parts are pivotally connected together and also adapted for movement relative to each other to draw the jaws together and clamp the bumper. Herein the jaw 13 is formed on a relatively straight end portion 17 of a generally S-shaped bracket 18 whose other substantially parallel end portion 19 projects rearwardly midway between the bumper edges and provides a platform for the king pin 12.

In the present instance, the bracket end 17 is bifurcated and divided into two laterally spaced arms joined by a strut 20 and reinforced by ribs 21. Adjacent their ends, the arms are undercut to form shoulders 22 which are inclined backwardly to hook around and fit securely against the inner surface of the bumper at the upper edge thereof.

The king pin 12 may be in the form of a ball rigid with a shank 23 which projects through a hole 24 in the platform 19. A nut 25 threaded onto the shank end clamps the platform rigidly against a flange 26. The platform may be reinforced by a depending peripheral skirt 27 and by the reinforcing ribs 21 which are extended downwardly along the bracket 18 and merge with the top of the platform 19.

To enable the king pin platform to be located horizontally regardless of the shape and contour of the bumper, an abutment 28 projects from the back of the bracket 18 into engagement with the outer face 29 of the bumper and is mounted on the intermediate portion 30 of the bracket for adjustment toward and away from the bumper. Herein, there are two such abutments formed by the ends of screws 31 threading through ears 32 which are cast on opposite sides of the bracket and disposed to locate the screws approximately in the plane of the king pin platform 19. By means of a tool applied to a head 33, each screw may be turned to advance or retract the abutment 28 and thus bring the latter into engagement with the bumper face 29 when the platform is disposed horizontally with the hook 13 engaging the upper bumper edge. Nuts 34 on the screws are then tightened against the ears 32 to lock the screws against turning.

The lower jaw 14 comprises a hook bent from one end portion of a rod 35, the other end of which is substantially straight and extends diagonally across the outer bumper face and through a hole 36 in the intermediate portion 30 of the bracket 18. Herein the lower part of the rod is curved as indicated at 37 and the extreme end, which is preferably flattened, is turned upwardly to hook around the lower edge 16 of the bumper. By varying the curvature of the bend 37, the hook may be adapted to extend around the lower part of bumpers of various contours as illustrated in Figs. 2 and 3.

The hole 36 through which the rod 35 is projected is formed in a boss 38 cast on the intermediate portion 30 of the bracket 18 between the laterally spaced hooks 13. An arcuate surface 40 machined in the top of this boss provides a seat for a block 41 of complemental curvature having a hole 49 through which the rod 35 extends upwardly. The rod and the bracket 18 are thus pivotally connected to swivel about an axis which extends longitudinally of the bumper and is disposed behind the latter.

The flat upper surface of the block 41 forms an abutment for engagement with a nut 42 screwed onto the threaded upper end of the rod 35. When the nut is tightened down, the rod and the lower jaw 14 are raised, thereby deriving a force which draws the jaws 13 and 14 tightly against the bumper edges and presses the abutments 28 against the bumper face.

To adapt the attachment for use on relatively thick bumpers such as that illustrated in Fig. 3, provision is made for extending both of the jaws 13 and 14. For this purpose, an extension element 44 is arranged for engagement with the shoulders 22 of the jaws 13 and to project beyond these jaws and provide an auxiliary jaw 45 adapted to hook around the bumper edge 15. This extension is generally T-shaped as shown in Fig. 4 having downwardly bent shoulders 46 which interlock with the shoulders 22 of the jaws 13 when the extension is disposed substantially parallel to the bracket arm 17. When the extension 44 is used on the jaws 13, it usually will be necessary to make the hook 35 somewhat longer by extending the bend 37.

To apply the attachment above described to an ordinary automobile bumper, the bracket 18 is hooked over the upper edge of the bumper and swung inwardly to bring the screw ends 25 against the outer bumper face 29. With the lock nuts loosened, the screws 31 are turned in or out to thereby raise or lower the king pin platform 19 until the latter is disposed substantially horizontally and the king pin axis thus located vertically. After tightening the lock nuts 34 and with the nut 42 loosened, the lower jaw is hooked around the bumper edge 16. Now as the nut 42 is screwed down against the block 41, a downward bending force is exerted on the bracket 18 thereby drawing the upper jaw tightly against the back of the bumper and pressing the abutments 28 against the face 29. The attachment thus becomes clamped rigidly to the bumper but may be detached easily simply by loosening the clamping nut 42 and unlocking the jaws 13 and 14.

By virtue of the wide range of adjustment of the screws 31 and of the clamping nut 42, it will be apparent that the spacing of the jaws 13 and 14 and also the position of the abutments 28 in relation to the jaws may vary widely. Thus, the attachment without using the extension 44 may be adapted to a wide variety of widths and curvatures of bumpers as illustrated by the bumper shapes shown in full and in phantom in Fig. 2. Then to adapt the attachment for use with bumpers of unusual thickness, it is only necessary to add the comparatively simple extension 44 and use a different length or shape of hook 35.

We claim as our invention:

1. A bumper attachment comprising a generally S-shaped bracket having a jaw at one end adapted to hook around one edge of a bumper with the other end projecting outwardly from the face of the bumper, an upright king pin rigid with and mounted on said projecting end, an abutment projecting from said bracket into engagement with said bumper face and adjustable relative to the bracket to vary the inclination of said king pin relative to the plane of the bumper, means on said bracket between said king pin and said jaw providing a swivel seat facing in a direction away from the other bumper edge, a bearing block swiveled in said seat and having a hole therethrough, a threaded rod projecting through said block hole and said bracket, a second jaw on one end of said rod adapted to hook around the other bumper edge, and a nut threaded onto the other end of said rod and acting against said block to draw said second jaw toward said bracket.

2. A bumper attachment comprising a generally S-shaped bracket having a hook at one end adapted to fit over and interengage with one edge of a bumper with the other end projecting outwardly from the side of the bumper intermediate the edges thereof, said projecting end being adapted to support a coupling element such as a king pin, two members projecting from said bracket for engagement with said bumper side on opposite sides of said hook and mounted on said bracket for axial adjustment relative thereto to vary the angle of said outer bracket end, a rod projecting through said bracket diagonally thereof and having a hook at its end adapted to interfit with the other edge of the bumper, and means providing a threaded connection between said rod and said bracket for adjustment of the two axially of the rod to swing said bracket about the ends of said members and thereby clamp the bracket rigidly to the bumper.

3. A bumper attachment comprising a bracket having a hook at one end adapted to fit over and interengage with one edge of a bumper, said bracket extending partially across the outer face of the bumper with its other end projecting outwardly from the bumper intermediate the edges thereof, a coupling element mounted on said projecting bracket end, means on said bracket providing an abutment engageable with said bumper face and mounted for adjustment relative to said bracket to swing the latter about said bumper edge and thus vary the angle of said coupling element, a hooked rod adapted to interfit with the other edge of the bumper, and means providing a threaded connection between said rod and said bracket for adjustment of the two to swing the bracket about the end of said abutment and thereby clamp the bracket against the bumper.

4. A bumper attachment comprising a bracket having a hook at one end adapted to fit over and interengage with one edge of a bumper, said bracket extending partially across the outer face of the bumper with its other end projecting outwardly from the bumper intermediate the edges thereof, a coupling element mounted on said projecting bracket end, means on said bracket providing an abutment engageable with said bumper face and mounted for adjustment relative to said bracket to swing the latter about said bumper edge and thus vary the angle of said coupling element, a bearing block having a hole therethrough and swiveled on said bracket intermediate the ends thereof to swing about an axis extending longitudinally of the bumper, a rod having a threaded end portion extending diagonally of the bumper through said block hole, said rod having a hook on the other end interengageable with the other edge of the bumper, and a nut threaded onto said rod and acting against said block to tighten said hooks against the bumper edges while said abutment is in engagement with the bumper face.

5. A bumper attachment comprising two elongated hooks interengageable with opposite edges of a bumper, the shanks of the hooks projecting transversely of the outer bumper face and crossing each other, a connection between said hook shanks providing for swiveling of the two relative to each other about an axis extending longitudinally of the bumper, an abutment on one of said hook shanks adjustable toward and away from the outer face of the bumper and adapted for bearing engagement therewith, means for shifting said hook shanks relative to each other transversely of said axis to clamp said hooks against the bumper edges while said abutment is engaging the bumper face, and a coupling element rigid with one of said hooks and disposed at an angle relative to the bumper determined by the adjustment of said abutment.

6. An attachment for a laterally curved vehicle bumper comprising a first jaw adapted to grip one of the longitudinal edges of the bumper, an upstanding king pin carried by said fixed jaw, a pair of screws threading directly through said jaw and supported entirely by the latter for abutting engagement with the curved outer face of the bumper, said screws being adapted to vary the inclination of said jaw and said king pin with respect to the face of the bumper, an adjustable jaw adapted for gripping engagement with the other longitudinal edge of the bumper, and means for drawing said jaws together with the bumper clamped rigidly therebetween.

7. A coupling device for detachable mounting upon a vehicle bumper comprising, in combination, a jaw adapted for engagement with one of the longitudinal edges of the bumper and having a portion extending from the bumper edge partially and transversely across the outer face of the bumper, said fixed jaw having a coupling means projecting outwardly therefrom, screw means threaded directly through said extending jaw portion and supported entirely by the latter to project inwardly therefrom toward the bumper for engagement with the outer face thereof, said abutment means by adjustment relative to said jaw portion being adapted to orient said coupling means in a vertical plane toward or away from the bumper, an adjustable jaw adapted for engagement with the other longitudinal edge of the bumper, and means for drawing said jaws together with the bumper clamped rigidly therebetween.

MAX E. DAYTON.
CHARLES R. POLSTRA.

REFERENCES CITED

The following references are of record in the file of this patent:

UNITED STATES PATENTS

| Number | Name | Date |
| --- | --- | --- |
| 2,360,643 | Bixel | Oct. 17, 1944 |
| 2,432,249 | Pearson | Dec. 9, 1947 |
| 2,440,877 | Russell | May 4, 1948 |
| 2,446,218 | Dunlap | Aug. 3, 1948 |
| 2,458,667 | Williams | June 11, 1949 |
| 2,474,078 | Wilcox | June 21, 1949 |